June 11, 1929.  D. HOLT  1,717,035
LIGHTING FIXTURE AND THE LIKE
Filed May 14, 1928
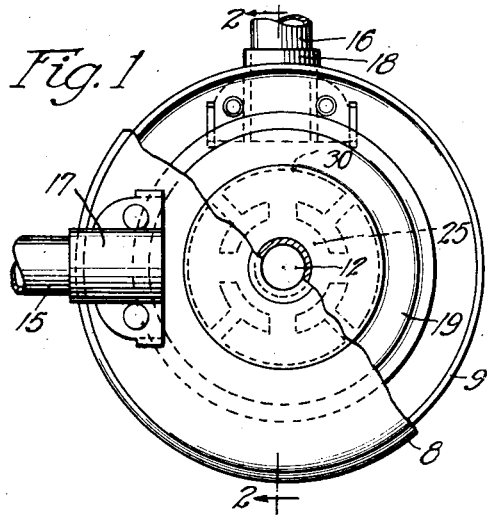
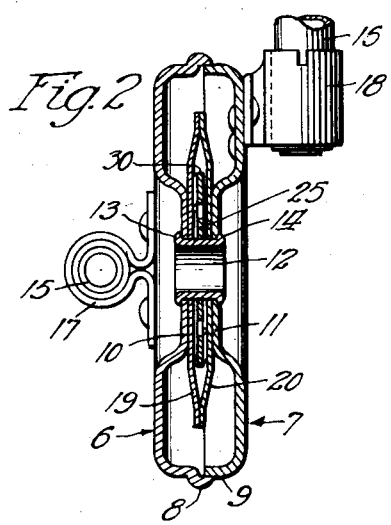
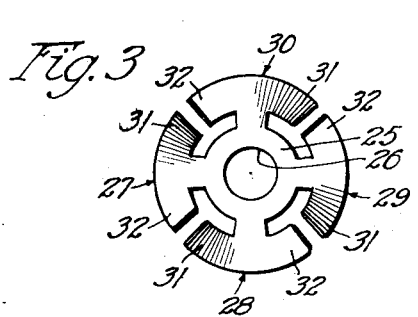
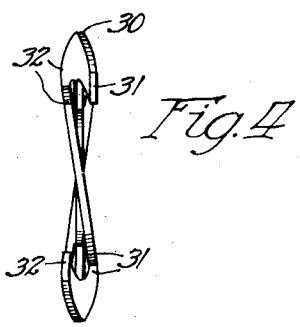
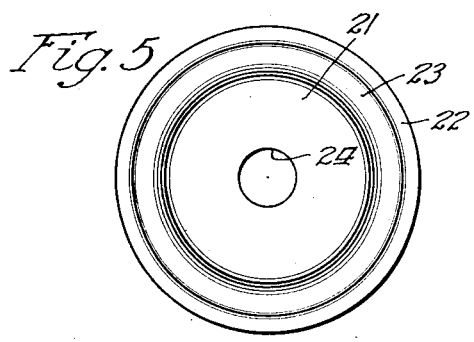
Inventor
Donald Holt Patented June 11, 1929.

1,717,035

UNITED STATES PATENT OFFICE.

DONALD HOLT, OF CHICAGO, ILLINOIS.

LIGHTING FIXTURE AND THE LIKE.

Application filed May 14, 1928. Serial No. 277,598.

This invention relates to certain improvements in lighting fixtures and similar structures. More particularly, it has to do with improvements in lighting fixtures of the general type disclosed and illustrated in my copending application for Letters Patent of the United States on improvements in lighting fixtures, Serial No. 223,084, filed September 30, 1927, and allowed March 31, 1928, which has matured into Patent No. 1,689,488.

Still more particularly, the invention relates to improvements in the swivel joints whereby the arms of the lighting fixtures are jointed together so that they can be turned into different angular positions.

In the construction of the aforesaid earlier application, each of these joints comprises a pair of companion cup-shaped elements, the peripheral portions of which are telescoped together. These cup-shaped members are centrally joined together by means of a tubular or hollow rivet, upon which the cup-shaped members are journaled so that they can rotate with respect to each other. Intermediate between, and within, the cup-shaped members there are placed a pair of dished, phosphor-bronze, spring disks, the same being also journaled on the aforesaid tubular rivet; and these spring disks are set with their concave faces toward each other, and with their convex central portions in engagement with the inner surfaces of the two housing cups. In the construction of the aforesaid earlier patent, the parts are so proportioned that the cup-shaped housing members are drawn towards each other by a tension exerted by the rivet so that they are in frictional contact with the central portions of the spring disks, the peripheral portions of the spring disks being in contact with each other, but not in contact with the housing.

The present invention relates to improvements in the foregoing general type of construction; said improvements consisting in placing a spring element within and between the two spring disks, said spring element tending to force the spring disks against the central portions of the cup-shaped housing members with a greater force than would be exerted at that point due merely to the frictional engagement of the peripheries of the spring disks themselves. Thus the total amount of friction is materially increased without the necessity of drawing the peripheral portions of the spring disks more forcibly in contact with each other.

More specifically, the invention relates to an improved type of structure in which the spring element is peculiarly formed so that it can be readily stamped out of sheet spring-metal at an extremely low cost.

In connection with the foregoing, it is a further object to provide this spring element in such a form that it can be readily used with bracket members and spring disks of a standard construction already adopted and extensively in service.

Other objects and uses of the invention will appear from a detailed description of the same, which consists in the features of construction and combinations of parts hereinafter described and claimed.

In the drawing,—

Fig. 1 shows a side face view of one of the swivel joints of the general type shown in my aforesaid Patent No. 1,689,488, but having applied thereto the spring element to which the present invention particularly relates, a portion of the structure being broken away so as to reveal the interior construction thereof;

Fig. 2 shows a cross section on the line 2—2 of Fig. 1, looking in the direction of the arrows;

Fig. 3 shows a face view of one of the spring elements formed out of sheet spring-steel;

Fig. 4 shows an edge view corresponding to Fig. 3, but on an enlarged scale; and Fig. 5 shows a face view of one of the spring disks.

The swivel joint comprises the cup members 6 and 7, the edge portions 8 and 9 of which are properly shaped and of proper sizes to telescope in the manner indicated in Fig. 2. The amount of this telescoping action does not need to be large, but there should be a sufficient amount of it to allow the housing members 6 and 7 to be drawn towards each other a sufficient distance to place the spring members under the desired compression and also to help in keeping the housing members properly aligned.

The central portions 10 and 11 of the housing members 6 and 7 are dished inwardly, as shown in Fig. 2, so as to establish hub portions of relatively large diameter. The inside proximate faces of these hub elements 10 and 11 are substantially flat and circular.

A tubular rivet 12 is set through the two housing members, and its ends 13 and 14 are flanged over, as shown in Fig. 2, so as to prevent the housing members from pulling apart.

At the same time, these members are efficiently journaled with respect to each other.

The arms 15 and 16 of the lamp bracket are connected to the housing members 6 and 7 by suitable fixtures 17 and 18, which constitute no part of the present invention.

Intermediate and within the housing members 6 and 7 there are placed a pair of companion spring disks 19 and 20. These are of the general form evident from a comparison of Figs. 2 and 5. They are circular, having flat central or hub portions 21, flat peripheral portions 22, off-set portions 23, and central perforations 24. These companion members 19 and 20 are set on to the rivet member 12 with their concave faces toward each other, as shown in Fig. 2. The result is that their central flat portions 21 are in position to engage the hub portions 10 and 11 of the housing members 6 and 7, while the flat peripheral portions 22 are in position to contact with each other. When the two housing members are forced together, the flat central portions 21 will engage the hub portions 10 and 11 with an amount of pressure almost equal to the pressure exerted between the peripheral portions 22. In the construction shown in my Patent No. 1,689,488, these two pressures are equal to each other. According to the structure of the present application, the presence of the spring member located between the two spring disks serves to create an additional pressure between the flat portions 21 of the spring disks and the hub portions 10 and 11 of the housing members.

Ordinarily, the housing members will be made of sheet steel or wrought iron; and experience has demonstrated that the creation of an increased pressure of the central portions of spring disks made of phosphor bronze is very desirable when the housing members are of sheet steel or wrought iron, or similar material. In this connection, it will be noted that the friction between the peripheral portions 22 of the spring disks is exerted at a much greater radius than the friction between the central portions of the spring disks and the central portions of the housings; and since the torque which can be exerted between two such parts is equal to the amount of surface friction multiplied by the radius, it follows that, other things being equal, the frictional torque between the outer peripheral portions of the spring disks will be greater than that between the flat portions thereof and the housing members. As a result, the maximum degree of resistance to turning one housing member with respect to the other cannot be produced except by increasing the pressure between the central portions of the spring disks and the housing members themselves; which result I accomplish by placing a suitable spring member between the spring disks.

The particular spring member illustrated is shown in detail in Figs. 3 and 4. It includes a central hub portion 25 having a perforation 26 to receive the rivet member 12. Extending out from the central hub portion 25 are the radial arms 27, 28, 29 and 30, and each of these arms terminates in a pair of angularly extending fingers 31 and 32. These fingers in turn are offset from each other by twisting the arms 27, 28, 29 and 30, which fact will be readily evident from the shading on Fig. 3, and also from a comparison of Figs. 3 and 4. For example, at the upper portion of Fig. 4, it will be seen that the finger 31 stands considerably to the right of the finger 32 of the upper arm 30; and, similarly, that the finger 31 of each of the arms stands considerably to the right of the finger 32 of such arm.

The amount of this offsetting is readily controlled by the form of the dies in which the spring members are made; and thus it is easily possible to make up these spring members so that they can be set in between the spring disks. Then, when the two housing members are forced together and the rivet 12 is headed over, there will be a considerable increase of pressure between the central portions of the spring disks and the housing members as compared to the pressure existing between the peripheral portions of the spring disks themselves.

The formation of the spring member in the above manner, and particularly stamping it out from sheet spring-metal, makes it possible to get the desired amount of spring action and the desired amount of pressure within a relatively thin article which can be readily set between spring disks of a design already extensively in service.

While I have herein shown and described only a single embodiment of the features of my present invention, still I do not intend to limit myself thereto except as I may do so in the claims.

I claim:

1. As a new article of manufacture, a swivel joint for the purpose specified comprising a pair of companion cup-shaped circular members having their peripheral edge portions of proper size and contour to overlap in telescoping relationship, the central portions of said members being cupped inwardly towards each other, a circular thimble extending through the central portions of said members, said members being pivoted on said thimble, the ends of the thimble being flanged outwardly against the outside faces of the members, a pair of phosphor-bronze spring disks pivotally mounted upon said thimble between the central portions of the members aforesaid, said phosphor-bronze spring disks being dished and located with their concave faces together, the peripheral portions of said disks being flattened and in frictional contact with each other and the central portions of said disks being flattened and in contact with the central portions of the cup members, the parts being so proportioned that the phosphor-bronze disks are normally under spring compression, and a spring member surrounding the circular thimble and located between the spring disks and tending to force the central portions of said spring disks outwardly away from each other and more firmly into engagement with the central portions of the cup members, substantially as described.

2. As a new article of manufacture, a swivel joint for the purpose specified comprising in combination a pair of cup-shaped members having their peripheral portions freely movable with respect to each other, and having their central portions dished inwardly towards each other, a hub member extending through the central portions of both of the cup members, the cup members being pivotally mounted on the hub member, means in conjunction with the hub member for retaining the cup members thereon and preventing the cup members from separating from each other, a pair of dish-shaped spring disks of phosphor bronze located on the hub member and between the central portions of the disk members, said spring disks being placed with their concave faces towards each other and with their peripheral portions in frictional contact with each other, and a spring member surrounding the circular thimble and located between the spring disks and tending to force the central portions of said spring disks outwardly away from each other and more firmly into engagement with the central portions of the cup members, substantially as described.

3. As a new article of manufacture, a swivel joint for the purpose specified comprising in combination a pair of cup-shaped companion members having their central hub portions dished in towards each other, a hub member on which said central portions are pivotally mounted, means in conjunction with the end portions of said hub member serving to retain the cup members thereon and serving to prevent the cup members from moving outwardly away from each other, a pair of dished spring disks on said hub member between the central portions of the cup members, said spring disks being placed with their concave faces toward each other and with their peripheral portions in frictional contact with each other, and a spring member surrounding the circular thimble and located between the spring disks and tending to force the central portions of said spring disks outwardly away from each other and more firmly into engagement with the central portions of the cup members, substantially as described.

4. As a new article of manufacture, a swivel joint for the purpose specified comprising in combination a pair of members rotatable with respect to each other, a hub member on which they are journaled, means in conjunction with the end portions of said hub member serving to retain the members on the hub member and also serving to prevent the members from moving outwardly away from each other, a pair of dish-shaped spring disks located on the hub member between the first mentioned members and with their peripheral portions in frictional contact with each other, and a spring member surrounding the circular thimble and located between the spring disks and tending to force the central portions of said spring disks outwardly away from each other and more firmly into engagement with the central portions of the cup members, substantially as described.

DONALD HOLT.